Oct. 6, 1925.
T. R. MacMECHEN ET AL
1,556,560
TANDEM MULTIPLANE
Filed June 6, 1925   2 Sheets-Sheet 1
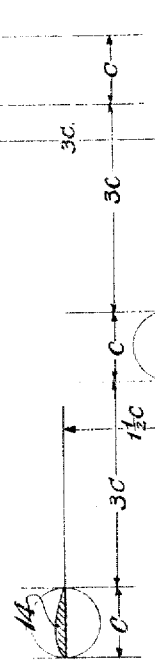
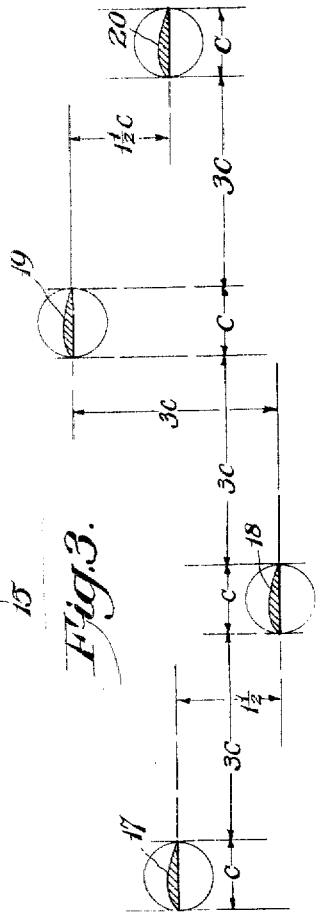
INVENTORS
*Thomas R. MacMechen*
*& Alexander Klemin.*
BY *Alfred T. Bratton*
ATTORNEY.

Oct. 6, 1925. 1,556,560
T. R. MacMECHEN ET AL
TANDEM MULTIPLANE
Filed June 6, 1925    2 Sheets-Sheet 2
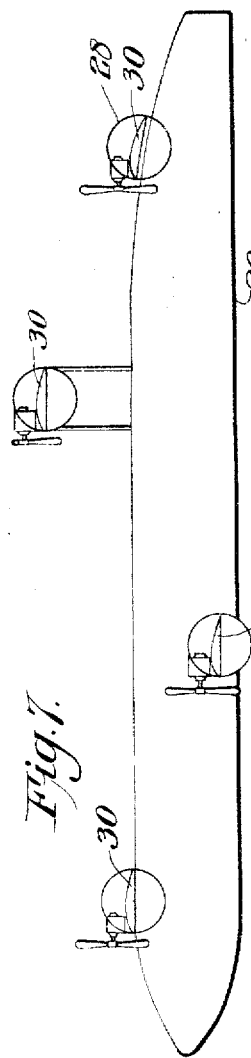
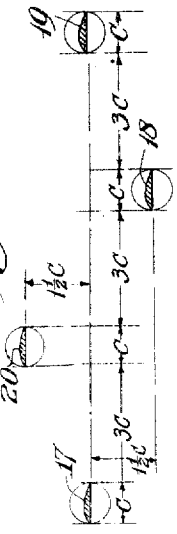
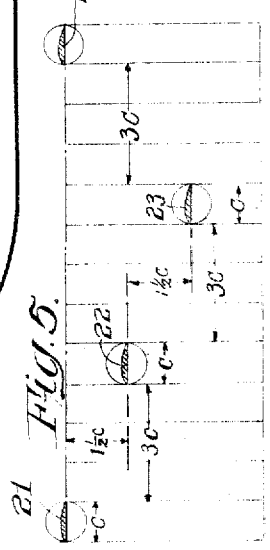
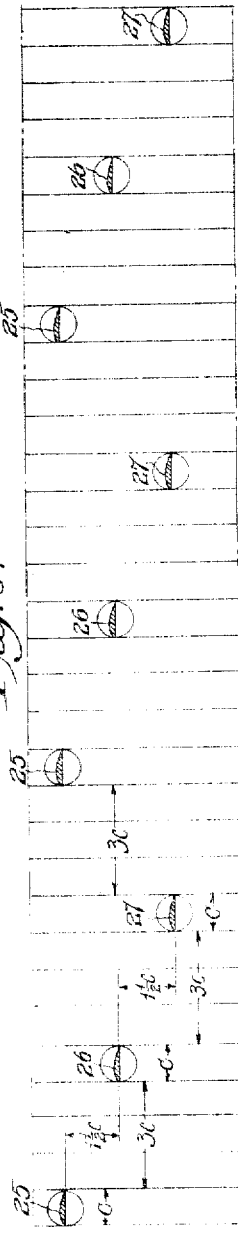
INVENTORS
Thomas R. MacMechen,
& Alexander Klemin,
BY Alfred S. Bratton
ATTORNEY.

Patented Oct. 6, 1925.

1,556,560

UNITED STATES PATENT OFFICE.

THOMAS R. MacMECHEN AND ALEXANDER KLEMIN, OF NEW YORK, N. Y.

TANDEM MULTIPLANE.

Application filed June 6, 1925. Serial No. 35,340.

*To all whom it may concern:*

Be it known that we, THOMAS RUTHERFORD MACMECHEN and ALEXANDER KLEMIN, citizens of the United States of America, residing at New York city, in the county and State of New York, have invented certain new and useful Improvements in Tandem Multiplanes, of which the following is a specification.

This invention relates to aeroplanes and it has more particular reference to that type now commonly known as monoplanes as distinguished from others involving superposed air planes in spaced relation.

In the construction of large aeroplanes, it is theoretically demonstrable that with increasing size the weight of the structure as a percentage of the gross weight increases appreciably. If a machine is large enough this percentage increase in the weight of structure becomes so great that even refinement in design—possible in large machines—is insufficient to affect the increase in weight. Therefore a point is ultimately reached where the machine becomes so large, and the structural percentage of weight is so great, that when the weight of the power plant is added to the structural weight, no useful load remains: useful load representing capacity for adequate fuel, passengers, baggage and so forth.

Designers of aircraft have endeavored to meet this size limitation by departing from the most efficient type of machine at present extant—the monoplane—by using biplanes, triplanes and multiplanes.

Even with the adoption and use of bi-planes or tri-planes the weight limitation must be reached with a sufficiently large machine; furthermore, such machines are characterized by a marked decrease of aerodynamic efficiency. Again the use of quadruplanes has never been seriously contemplated by reason of the aero-dynamic inefficiency of such an arrangement of planes. Again, it has been suggested that a system of tandem or follow planes might overcome the above referred to weight limitation.

Accordingly it may be here stated that an important object of our invention is to overcome the recited objections by providing a novel system of tandem planes so correlated and relatively positioned as to provide an heavier than air flying machine, capable of transporting a pay load on economical and profitable lines.

Accordingly we have devised a novel tandem multi-plane system of aerofoils so arranged that the pay load is better distributed relative to a larger area or number of wings, each said wing having a comparatively smaller span as compared with monoplanes hitherto adapted to lift and carry the same load. A further advantage of our novel system of aerofoils is that the weight of the wings is reduced, while it is feasible to distribute the load along the entire length of the machine whereby the structural lightening of the fuselage or body is attained.

Again, our novel tandem multi-plane system of aerofoils precludes the tremendous concentration of forces locally as is present with bi-planes or triplanes hitherto suggested wherein the whole lift of the entire wing system is transmitted to two points on either side of the fuselage or body. Accordingly it may be correctly premised, and we have successfully proven as hereinafter set forth, that a tandem type of multi-plane offers the correct solution to the problem of heavier than air craft of larger dimensions capable of transporting a pay load upon successful lines. In other words we have successfully proven by exhaustive tests that our novel system of relatively positioned aerofoils overcomes all the present disadvantages inhering to monoplane, biplane, triplane or quadruplane types. As a natural sequel we are enabled to construct heavier than air craft of no larger over-all dimensions than now obtains with a lighter percentage of structural weight, thereby augmenting the pay load and rendering them more profitable commercially.

With the foregoing and other objects and inherent advantages in view, our invention may be tersely defined as consisting essentially in so disposing the respective aerofoils of a tandem multi-plane as to ensure the maximum carrying capacity while attaining a degree of flying stability hitherto unknown.

In order that our invention may be readily comprehended by those acquainted with aero-dynamics, we will now describe the same by reference to the accompanying sheets of diagrammatic drawings. These drawings typify tandem multi-plane combinations embodying the essential features of our invention, and in the several views corresponding elements are designated by like characters of reference, while the subjoined claims serve to point out in succinct terms the features we believe to be novel and therefore patentable over prior art.

Figure 1—is a diagrammatic illustration showing the action of a wing unit in deflecting the air stream so that the lift force on a succeeding wing is deflected over from the vertical.

Figure 2—is a view showing the preferred disposition of three wings arranged in accordance with our invention.

Figure 3—is a similar diagrammatic view illustrating a four wing combination embodying our improved placement system.

Figure 4— is a slightly modified showing of the arrangement illustrated by the preceding view.

Figure 5—is a further typical example of a four wing combination on what may be termed definite serial sequence lines.

Figure 6—is an extension of the form of our invention shown in Figure 5 to an extended air craft; and Figure 7, is an outline of the showing illustrated in Figure 3, as applied to a flying machine along successful pay load commercial lines.

In the following description it is to be clearly understood that the several views while diagrammatic and devoid of structural details are positively indicative of the proposed relation of the respective elements or units.

Referring firstly to Figure 1, a pair of aerofoils or wings are respectively designated by the numerals 10, 11, the former being the leading one, while the air stream lines thereover are characterized by fine lines 12. Now, it will be clearly apparent to anyone but slightly acquainted with aerodynamics that the air stream encountered by the rear wing 11 is exerting a "downwash" or drag thereon as indicated by the arrow 13. Incidentally this drag or downwash from the front wing 10 affects the rear wing disadvantageously, and such effect is intensified when multiple tandem wings are employed. Knowing this inherent difficulty we have by systematic wind tunnel experiments and investigation so disposed the wings of our novel tandem multiplane combination as to evolve a machine, practical structurally and possessing the requisite aero-dynamic efficiency, by largely—if not entirely—eliminating all downwash interference.

In the typified combinations of Figures 2–4 it is to be noted that assuming the chord dimension as $c$ the relative dispositions may be capitulated as follows:—

Figure 2, illustrates three wings 14, 15 and 16 with a relative disposition as follows. The second wing 15 is located at a three chord span in rear of the leading wing 14 with a one-and-one-half chord drop; whereas the trailing wing 16 is located at a three chord interval in rear of the second wing 15 with a three chord elevation relative thereto, or a one-and-one-half chord location above the leading wing 14. The wing 16 or its counterpart is hereinafter referred to as the "parasol" wing, in that by virtue of its relation to the other wings it is mainly functional as a sustaining unit ensuring flying stability both laterally and longitudinally of the machine.

In Figure 3, we have shown the three wings 17, 18 and 19 as disposed along identical lines with the wings 14, 15 and 16 of Figure 2, but with the addition of a tail wing 20 located in the rear of the wing 19 at a span of three chords and drop of one-and-one-half chords relative thereto. Incidentally it will be remarked that the tail wing 20 is disposed co-planal with the leading wing 17.

Figure 4, is along the lines of Figure 3 with the exception that the parasol wing 20 is transposed relative to the lower wing 18, accordingly the same reference characters are applied thereto and further elaboration omitted.

Turning now to Figures 5 and 6, we will first of all outline the relation of the wings in the first mentioned view which illustrates four wings 21, 22, 23 and 24. It is to be particularly observed that the wings 21, 24 are on the same plane, whereas the wings 22, 23 are located at three chord intervals with a successive drop of one-and-one-half chords relative to the leading wing 21, whereas the altitude relation of the wings 23, 24 is three chords.

Figure 6, typifies a succession of wings 25, 26, 27 relatively spaced at three chord intervals with stepped successive drops of one-and-one-half chords, it being particularly noteworthy that the respective wings of each succeeding set of three are complementarily disposed. This disposition of the wings 25, 26, 27 affords a structurally stable combination for large aircraft along commercial lines and is devoid of longitudinal interference.

Turning now to an explanation of the reasons for the specifically recited combinations of wings above set forth, it is to be noted that heretofore designers of heavier than air flying machines and more particularly tandem planes have been ignorant of the aero-dynamics involved. Furthermore, while vaguely recognizing there existed interference between a forward and a rear plane, few attempts, if any, have been directed to an investigation of such interference, or to the evolution of means to avoid said interference. As a natural result, the flying machines so far suggested have all been more or less impracticable for pay load usage by virtue of the interference above stated, and the consequent aero-dynamic inefficiency. Another fundamental reason for the induced drag in machines previously exploited is the action of the tip vortices. Such induced drag is a disadvantage in the case of a monoplane, a biplane or a triplane not disposed in tandem, while it is of still greater consequence in the case of airplanes having wings disposed in tandem.

Thus it has become acknowledged that the vortices of a forward wing caused a pronounced "downwash" on the following wing, therefore such following wing or wings no longer traverses an air stream which is in the same direction as the air stream encountered by the forward plane but it is operating in a downwardly directed air stream. Applying the foregoing to the showing of Figure 1, it will be apparent that the lift force on the wing 11 is acting perpendicularly to the downwardly deflected air stream 12, or in other words obliquely to that exerted on the wing 10. The lift force therefore now has a component which is in a direction of drag or resistance, as indicated by the arrow 13. Such drag or resistance in a combination of wings—not aero-dynamically correctly related or disposed—is obviously greatly increased.

In previously suggested tandem planes claiming to avoid drag interference, such claim has not been substantiated by experiments and is purely hypothetical.

In our initial experiments on tandem planes in the wind tunnel under a steady wind and forces measured to simulate actual flight conditions, we found that the known tandem biplane combinations were impracticable as the values of lift coefficients were low and the values of drag greatly increased. The resultant efficiency of lift over drag values were so low that we found it would be impossible to fly such machines without a disproportionate expenditure of power, and if capable of flight at all no useful or pay load could be accommodated and carried. As a result of an extensive series of tests we discovered the true principle of tandem plane arrangement, and the useful combinations illustrated in Figures 2-7 are of a proven character to produce entirely practicable and profitable machines. Accordingly, it will be understood that the correct disposition of following wings, such as 15, 16 or 18, 19, 20 relative to the respective front wings 14, 17 is dependent on rearward displacement, and also displacement in a vertical direction. Hence the rearward and vertical displacements of the planes 15, 16 or 18, 19, 20 must, for practical reasons be as small as possible in order to provide a compact machine having neither too great an overall length and height.

Our experiments also proved the advantage of providing the wings with sheltering fins 28, Figures 2-7, whereby the tip vortices are largely eliminated and the "downwash" in the rear of the front plane substantially reduced. Accordingly, we have illustrated all of our wing combinations as provided with sheltering or tip fins 28, but it is to be distinctly understood that we do not confine ourselves to their use as we have obtained satisfactory efficiency results without them.

Consequent upon our tests we have definitely discovered that in order to place a tandem wing 15, 18 in the correct position where it is not seriously interfered with by the respective front plane 14, 17 it must be disposed at a distance to the rear thereof of three chord lengths, and a distance downward of one-and-one-half chords. Such a disposition we have found places the wings 15, 18 in a position where the interference from the front wings is so materially reduced that the efficiency of said wings is raised to practicable values. At the same time we found that placing the tandem wings 15, 18 in excess of three chords length span along the line of flight, and at more than one-and-one-half chords vertical drop relative to the front wings 14, 17 did not increase the efficiency to any appreciable degree. Hence it will be apparent any material excess of the relative chord spans would not be of a practicable character.

Another very important factor discerned as an outcome of our experiments is that the placement of a tandem wing to the rear and above the leading wing is not efficient, hence negative stagger as it is now known in the art is inadvisable.

Advancement with our series of tests disclosed that where three wings such as 14, 15 and 16 were arranged, as shown in Figure 2, with the trailing wing 16 at the hereinbefore stated negative stagger, all detrimental effects incident to such negative placement were eliminated and substantially normal values obtained for the aero-dynamics of the third wing 16. By a similar process of test and investigation we evolved the correct position for a fourth wing, such as 24 in Figure 5—or 19 in Figure 4—the same being located at three chords in rear of the third wings 23, 18, with a respective three chord and one-and-one-half chords elevation relative thereto; or in an efficient position of positive stagger in both examples. Continuing our tests we finally discovered that where tandem planes 25, 26, 27 were arranged in serial sequence of sets of three, as shown in Figure 6, each said set should be related with a positive stagger. Hence it will be apparent that by the set forth skillful disposition of tandem multi-planes we have secured all the advantages of a follow plane combination and attained a high aero-dynamic efficiency. Obviously the arrangement of planes set forth may be extended to five or more monoplane wings disposed in follow plane style.

Figure 7, illustrates the application of our improvements to an extended fuselage or body 29 with a series of wings 30 mounted relative thereto along the lines of the showing in Figure 3, with suitable aeronautical motors 31 carried by the forward and two trailing planes. This example is by way of illustration of the practical possibilities of our improvements commercially and it will be obvious the body 29 may be appropriately divided for passenger and freight accommodation, with ample leeway for power control, steering and other equipment as well as adequate fuel storage.

The results of our series of tests are briefly tabulated below:—(1) A single monoplane wing—maximum $K_y$ .0029 L/D 14.2. (2) Four wings with tip fins as arranged in Figure 3—maximum $K_y$ .00264 and maximum L/D, 8.8. (3) Four wings with tip fins as per Figure 5—maximum $K_y$ .00249 and maximum L/D, 10.45. (4) Three wings as per leading unit of Figure 6—maximum $K_y$ .00277 and maximum L/D 10.75. (5) Six wings as per two leading units of Figure 6—maximum $K_y$ .00254 and maximum L/D 8.7.

Still further we discovered that the provision of the fins 28 at the tip of the respective wings was always beneficial in that it invariably increased the wing efficiency, and diminished the downwash on the following wing. Such fins, however, form the subject matter of our co-pending application for patent filed the 16th day of March, 1925, under Serial Number 15,772, and are merely referred to herein as enhancing the efficiency of our present invention, and hence highly desirable in the production of a profitable machine.

Another feature noteworthy as a result of our exhaustive experimentation is that owing to the fact that "downwash" is not entirely eliminated it may be found advantageous to vary or modify the angle of incidence of the tandem wings relative to the leading one by disposing them at progressively larger angles from the front to the rear. The tandem wings are thus placed at larger effective angles of incidence than would otherwise be the case due to the downwash and the efficiency is increased thereby. A concrete example using four wings with the first leading one at zero degrees, the second at two degrees, the third at four degrees, and the fourth at six degrees disposed as shown in Figure 3 gave the following efficiency result—maximum $K_y$ .00284 and maximum L/D 9.36.

From the foregoing description and incorporated test data it is thought the present invention will be clearly apparent while the advance aero-dynamically in the art is so palpably obvious as not to require further elaboration herein. However, we desire it to be distinctly understood that we lay no claim broadly to any bi-or-multi follow plane system, but what we do claim, and desire to secure as our due reward, is a tandem multi-plane combination of aerofoils whereby a pay load may be profitably transported with a higher factor of flying stability and safety than has heretofore been obtainable.

Having described our invention what we claim is:—

1. A tandem multi-plane embodying a succession of aerofoils at substantially three chord intervals and substantially one-and-one-half descending altitudes from the leading to the rear aero foils.

2. A tandem multi-plane embodying three successive aerofoils disposed at three chord intervals with a descending altitude relation of one-and-one-half chords from the front aerofoil to the rear one.

3. A tandem multi-plane embodying a succession of aerofoils disposed at three chord intervals longitudinally and one-and-one-half chord descending relation from the forward aerofoil.

4. A tandem multi-plane embodying a succession of aerofoils disposed at three chord intervals longitudinally and one-and-one-half chord descending relation form the forward aerofoil, and the rear aerofoil raised at a similar elevation above the plane of the leading aerofoil.

5. A tandem multi-plane comprising successive series of aerofoils, each said series embodying units disposed at three chord intervals longitudinally and one-and-one-half chord descending relation.

6. A tandem multi-plane comprising successive series of aerofoils, each said series embodying three units disposed at three chord intervals longitudinally and one-and-one-half chord descending relation.

7. A tandem multi-plane comprising a succession of aerofoils at three chord intervals and one-and-one-half chord descending relation from front to rear of the plane and at a progressive angle of incidence with respect to the leading aerofoil.

8. A tandem multi-plane comprising a succession of aerofoils at three chord intervals and one-and-one-half chord descending relation from front to rear of the plane and at a progressive angle of incidence with respect to the leading aerofoil, the trailing unit being at a one-and-one-half chord elevation above said leading aerofoil.

9. A tandem multi-plane comprising a succession of aerofoils at three chord intervals and one-and-one-half chord descending relation from front to rear of the plane and at a progressive angle of incidence with respect to the leading aerofoil, one of the intermediate units being at a one-and-one-half elevation above said leading aerofoil.

In testimony whereof we affix our signatures to this specification the third day of June, 1925.

THOMAS R. MacMECHEN.
ALEXANDER KLEMIN.

9. A tandem multi-plane comprising a succession of aerofoils at three chord intervals and one-and-one-half chord descending relation from front to rear of the plane and at a progressive angle of incidence with respect to the leading aerofoil, one of the intermediate units being at a one-and-one-half elevation above said leading aerofoil.

In testimony whereof we affix our signatures to this specification the third day of June, 1925.

THOMAS R. MacMECHEN.
ALEXANDER KLEMIN.

Certificate of Correction.

It is hereby certified that Letters Patent No. 1,556,560, granted October 6, 1925, upon the application of Thomas R. MacMechen and Alexander Klemin, of New York, N. Y., for an improvement in "Tandem Multiplanes," were erroneously issued to said "MacMechen and Klemin" as joint owners, whereas said Letters Patent should have been issued to *Thomas R. MacMechen* as sole owner of said invention, as shown by the records of assignments in this office; and that the said Letters Patent should be read with this correction therein that the same may conform to the record of the case in the Patent Office.

Signed and sealed this 3d day of November, A. D. 1925.

[SEAL.]
KARL FENNING,
*Acting Commissioner of Patents.*

Certificate of Correction.

It is hereby certified that Letters Patent No. 1,556,560, granted October 6, 1925, upon the application of Thomas R. MacMechen and Alexander Klemin, of New York, N. Y., for an improvement in "Tandem Multiplanes," were erroneously issued to said "MacMechen and Klemin" as joint owners, whereas said Letters Patent should have been issued to *Thomas R. MacMechen* as sole owner of said invention, as shown by the records of assignments in this office; and that the said Letters Patent should be read with this correction therein that the same may conform to the record of the case in the Patent Office.

Signed and sealed this 3d day of November, A. D. 1925.

[SEAL.]                                      KARL FENNING,
*Acting Commissioner of Patents.*